March 10, 1925.  1,529,126
J. A. GREEN
LIQUID FUEL BURNER
Filed Feb. 2, 1923   2 Sheets-Sheet 1

Inventor
JOHNSTON A. GREEN

March 10, 1925.
J. A. GREEN
LIQUID FUEL BURNER
Filed Feb. 2, 1923
1,529,126
2 Sheets-Sheet 2
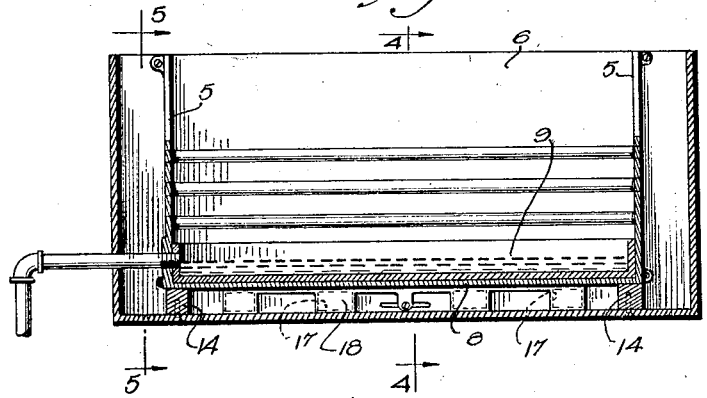
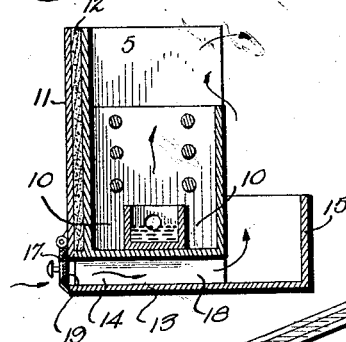
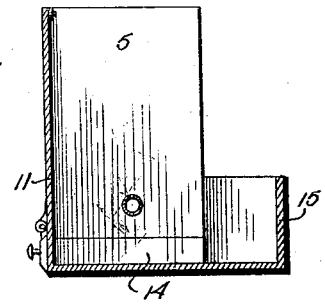
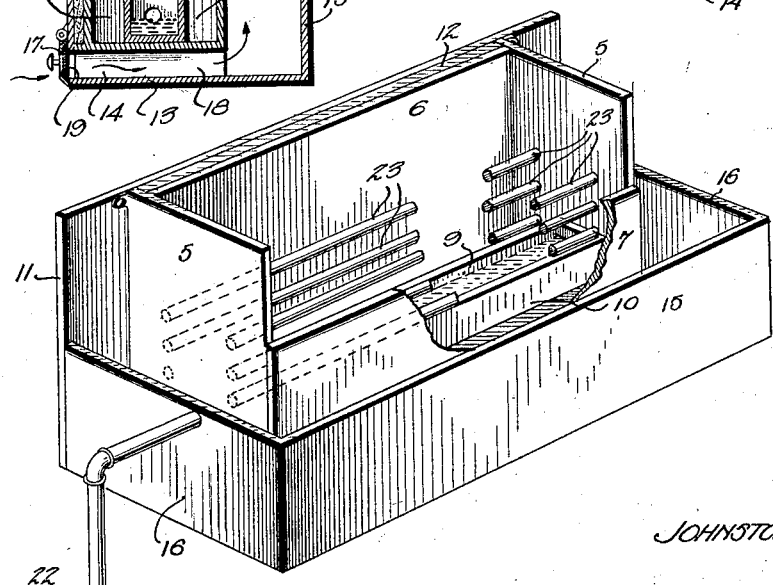
Inventor
JOHNSTON A. GREEN
By
Attorney Patented Mar. 10, 1925.

1,529,126

UNITED STATES PATENT OFFICE.

JOHNSTON A. GREEN, OF SIGOURNEY, IOWA.

LIQUID-FUEL BURNER.

Application filed February 2, 1923. Serial No. 616,557.

*To all whom it may concern:*

Be it known that I, JOHNSTON A. GREEN, a citizen of the United States, residing at Sigourney, in the county of Keokuk and State of Iowa, have invented certain new and useful Improvements in Liquid-Fuel Burners, of which the following is a specification.

This invention relates to liquid fuel burners and more particularly to kerosene burners.

An object of the invention is the provision of a burner that may be inserted in any type of stove and that will burn kerosene or other liquid fuel.

A further object is the provision of a burner of simple construction and relatively few parts.

Figure 1:
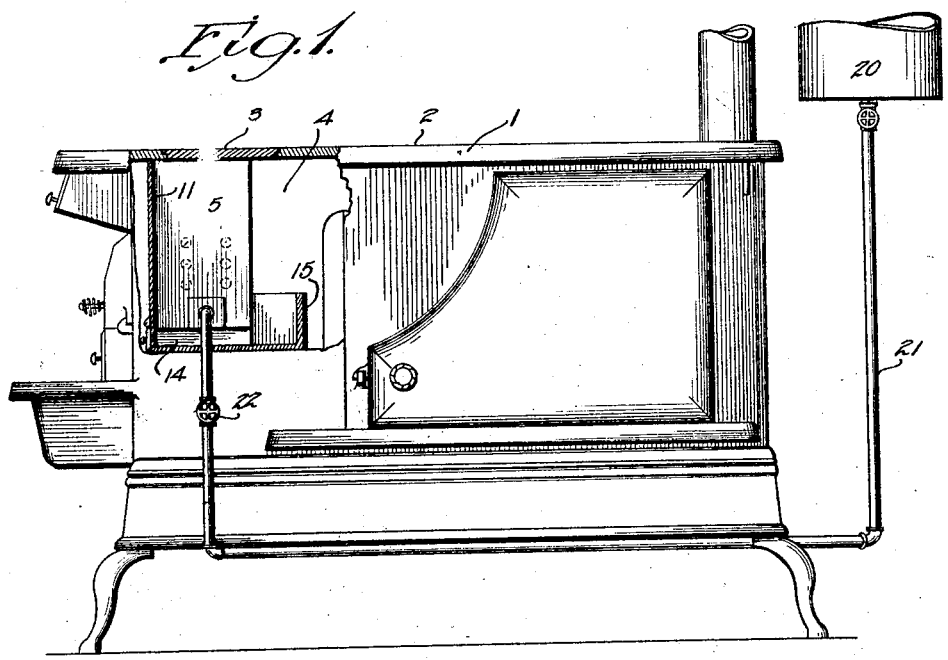
Figure 2:
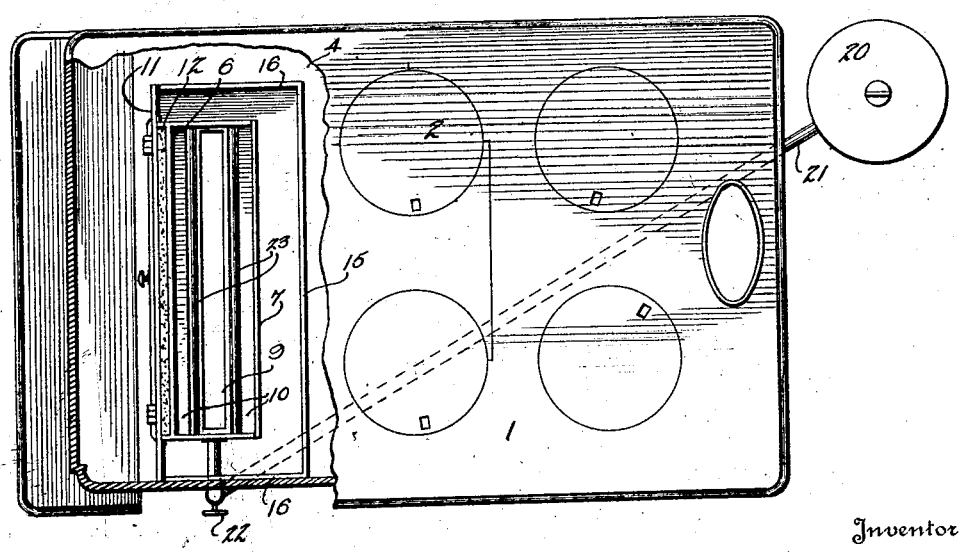

In the accompanying drawings, I have shown one embodiment of the invention. In this showing:

Figure 1 is a front elevation of a stove with the burner applied, parts being shown in section, Figure 2 is a plan view, parts being broken away to show the burner, Figure 3 is a vertical longitudinal sectional view of the burner removed from the stove, Figure 4 is a transverse sectional view on line 4—4 of Figure 3, Figure 5 is a similar view on line 5—5 of Figure 3, and, Figure 6 is a perspective view of the burner.

Referring to the drawings, the reference numeral 1 designates generally a cook stove of any type, having a top 2. The top is provided with stove lids 3 of the usual construction. The burner is adapted to be arranged in the fire-box 4. As shown, in detail in Figures 3 to 7 of the drawings, the burner comprises a burner casing having front and rear walls 5 and side walls 6 and 7. The side wall 6 is arranged at one side of the stove and is of greater height than the wall 7. The burner casing is provided with a bottom 8, adapted to receive a trough 9. The trough is arranged centrally of the bottom of the casing and extends longitudinally, forming channels 10 between the sides of the trough and the side walls. The burner casing is arranged within an air casing having a side wall 11 of substantially the same height as the side wall 6 and separated therefrom by a sheet of asbestos 12 or other heat insulating material. The bottom 13 of the air casing is spaced from the bottom of the burner casing by means of transverse members 14. The air casing is provided with a second side wall 15 which is materially lower than the side wall 11 and is also provided with front and rear walls 16. As shown in Figures 1 and 2 of the drawings, the burner extends longitudinally of the fire box from front to rear and the wall 11 closes the side of the stove and prevents entrance of air to the burner. Air is supplied to the burner by means of a plurality of openings 17, arranged adjacent the bottom of the side wall 11 in alinement with the space 18 between the bottom of the burner casing and the bottom of the air casing. These openings are controlled by sliding dampers or shutters 19.

A fuel tank 20 is arranged adjacent the stove at a suitable elevation to supply fuel by gravity and this tank is provided with an outlet pipe 21. The pipe communicates with the front of the burner passing through the front walls 5 and 16 and entering the trough 9. This pipe is provided with a suitable control valve 22. Within the burner casing, there is provided a plurality of longitudinally disposed rods 23, extending from the front to the rear and suitably mounted in the walls.

In operation, the fuel is delivered from the tank 20 to the trough 9 through the pipe 21. The flow of fuel may be controlled by the valve 22. The burner is a surface burner and the surface of the fuel in the trough is ignited, the air being fed through the space 18, as indicated by the arrows in Figure 4 of the drawings and joining the partially burned gases at the top of the burner to complete combustion. The provision of the rods 23 assist in breaking up the gases and vapors into more minute form before joining the air to complete combustion. During the operation of the burners, these rods become red hot and serve as a fuel atomizer.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a burner casing, said casing being provided with an open top, a trough arranged in the bottom of said casing, a plurality of spaced bars arranged above said trough, means for delivering liquid fuel to said trough, an air casing partially surrounding said burner casing, the bottoms of said casings being spaced from each other, said air casing being provided with air inlet openings arranged in alinement with said space, and dampers to control the flow of air through said opening.

2. In a device of the character described, a burner casing, said casing being provided with an open top and with one relatively low side wall, an air casing partially surrounding said burner casing, the bottoms of said casings being spaced from each other, said air casing being provided with one relatively low side wall, means for delivering air through the space between the bottoms of said casings from the side opposite said low walls, a trough arranged in said burner casing, means for delivering liquid fuel to said trough, and a plurality of bars arranged above said trough.

In testimony whereof, I affix my signature in presence of two witnesses.

JOHNSTON A. GREEN.

Witnesses:
 GEO. B. BARBER,
 JOSEPHINE GROST.